INVENTORS
H. B. IRVIN
J. W. DAVISON
BY
ATTORNEYS

United States Patent Office 3,123,004
Patented Mar. 3, 1964

3,123,004
LEVEL CONTROL WITH FLUID ACTUATED PUMP
Howard B. Irvin and Joseph W. Davison, Bartlesville, Okla., assignors to Phillips Petroleum Company, a corporation of Delaware
Filed Oct. 5, 1962, Ser. No. 228,616
5 Claims. (Cl. 103—16)

This invention relates to control of liquid level in one zone by manipulating the flow of pressure fluid to a pressure fluid driven motor driving a pump which pumps liquid from the one zone to another zone. In one aspect it relates to such controls wherein upon increase or decrease in the rate of flow of pressure fluid to the motor of the pump, such increase or decrease actuates a flow controller in such a manner as to regulate the rate of flow of pressure fluid to maintain a predetermined liquid level in the one zone.

An object of this invention is to provide apparatus and a method for maintaining the level of the liquid in a vessel at a predetermined level. Another object of this invention is to provide apparatus and a method for maintaining the level of the liquid in a vessel at a predetermined level by manipulating the pressure fluid flow to the engine driving the pump. Yet another object of this invention is to provide apparatus and a method for maintaining the level of a liquid in a vessel at a predetermined level irrespective of variations in the available pressure fluid used to drive the engine which drives the pump transferring liquid from the vessel. Still other objects and advantages of this invention will be realized upon reading the following description which taken with the attached drawing forms a part of this specification.

Figure 1:
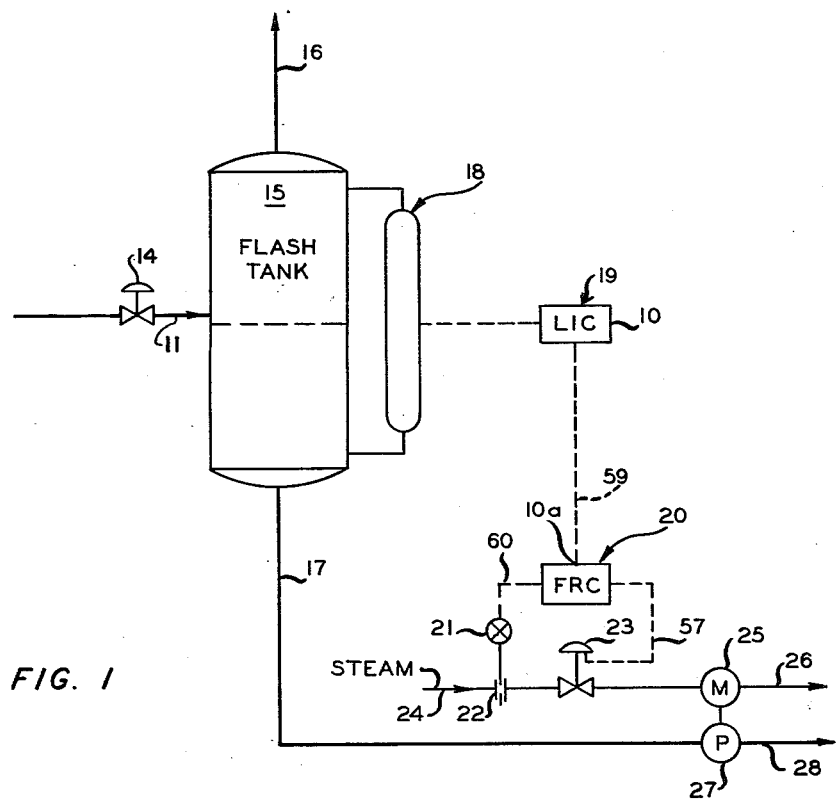
Figure 2:
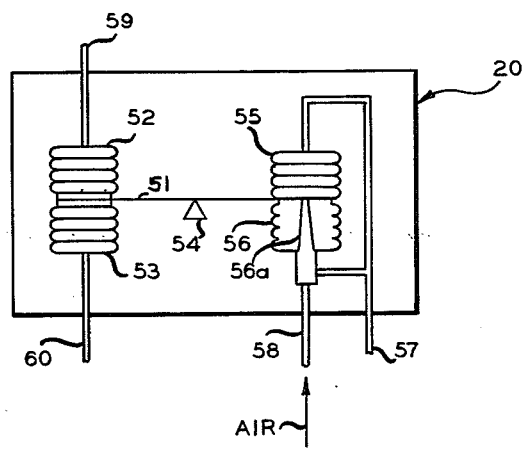

In the drawing FIGURE 1 illustrates, in diagrammatic form, an arrangement of apparatus parts for carrying out the process of this invention. FIGURE 2 illustrates in diagrammatic form, and on an enlarged scale, a portion of the apparatus of FIGURE 1.

In FIGURE 1 of the drawing reference numeral 11 identifies a conduit through which a liquid passes from a source, not shown, into a tank 15 which can be a flash tank or merely a surge vessel. Conduit 11 is provided with a pressure reducing valve 14. On reduction of pressure on passage of the liquid through the valve in conduit 11 flashing takes place. Flash vapors are withdrawn through a conduit 16 for such disposal as desired. Liquid remaining after flashing is withdrawn through a conduit 17 by a pump 27 for passage through a conduit 28 for such disposal as desired.

In order to maintain a predetermined liquid level in tank 15 a float assembly 18 is provided as illustrated. Attached to this float assembly is a level indicating controller 19 which emits a signal responsive to the level of liquid in tank 15 through a conduit 59 to a flow recorder controller 20. This controller 20 also emits a signal by way of a conduit 57 to the motor of a motor valve 23. A pressure fluid such as steam passes from a source, not shown, through a conduit 24 through motor valve 23 to a motor 25, such as a steam engine, for actuating pump 27 in the transfer of liquid from tank 15. Exhaust steam from motor 25 passes through a conduit 26 for subsequent use or disposal.

The flow recorder controller assembly 20 is also communicated by way of a conduit 60 to a flow transmitter 21 which in turn receives signals from a flow measurement assembly 22. This flow transmitter 21 in this particular case is a differential pressure cell which is frequently called in the instrument art a d/p cell. Such cells as d/p cell 21 are manufactured by the Foxboro Corporation of Foxboro, Massachusetts.

The apparatus contained inside the instrument box of the flow rate controller 20 is illustrated in diagrammatic form and in detail in FIGURE 2. This apparatus comprises a fulcrum 54 on which is placed a beam 51 which rotates around fulcrum 54. Bellows 52, 53, 55, and 56 are positioned on beam 51 as illustrated, that is, bellows 52 and 53 are placed on opposite sides of the beam at one end thereof. Bellows 55 and 56, the latter with nozzle 56a, are placed on opposite sides of the beam at the opposite end thereof from bellows 52 and 53. Conduit 58 communicates with bellows 56 and nozzle 56a and this conduit transmits air from a source, not shown, for actuating the motor of motor valve 23. The conduit 57 in FIGURE 2 is the conduit 57 in FIGURE 1 and this conduit leads from bellows 55 and nozzle 56a to the diaphragm of the diaphragm motor valve 23. It is realized, of course, that the motor of motor valve 23 is a pneumatically operable motor and opens with decrease of pneumatic pressure.

Conduit 59 connects, as illustrated in FIGURE 1, with the level indicating controller 19 while conduit 60 communicates with the d/p cell 21.

In the operation of this flow recorder controller 20, upon sensing a signal from float 18 indicating an increase in liquid level in vessel 15 the level controller 19 emits a signal through conduit 59 to bellows 52 that is proportional to the difference between the signal from float 18 and set point 10. This signal in bellows 52 tends to expand this bellows and push its end of the beam 51 downwardly. When the left-hand end of beam 51, as illustrated in FIGURE 2, moves downwardly the right-hand end thereof moves upwardly and by such movement more air is allowed to escape from nozzle 56a and thereby lowers the pressure in conduit 57 to the under side of the diaphragm of the diaphragm motor valve 23. This decrease in pneumatic pressure on the upper side of this valve opens the valve to allow an increase in steam flow through conduit 24 thereby increasing the rate of speed of motor 25 and pump 27. Thus, the rate of transfer of liquid from tank 15 increases. This increase in transfer lowers the liquid level in the tank.

Upon the just-mentioned increase in motor valve actuating air pressure from conduit 57, since conduit 57 also communicates with bellows 55, the pressure in this latter bellows is also decreased and the pressure decrease in bellows 55 offsets the decrease in pressure in bellows 56 so as not to tend to rotate the right-hand end of beam 51. Thus, by equalizing the pressure in bellows 55 and 56 the only effective pressure increase operating to rotate beam 51 is the increase in pressure in bellows 52.

As the steam flow through valve 23 and conduit 24 is increased, the rate of flow through this conduit is sensed by the orifice plate assembly 22. Thus, the pressure sensed on opposite sides of the orifice plate passes to the d/p cell 21 which emits a signal, responsive to the difference of these pressures, through conduit 60 to the flow rate controller 20. This pressure through conduit 60 is transmitted to the bellows 53. Thus, an increase of the pressure in bellows 52 because of the rise of level in tank 15, as mentioned above, also results in a slight increase in pressure in bellows 53 as a result of the increased flow of steam through conduit 54. Thus, this increase of air pressure in bellows 53 tends to offset the increase of pressure in bellows 52 thereby restricting undue downward movement of the left-hand end of beam 51.

Also the orifice plate assembly 22 and the d/p cell 21 operate in such a manner that upon an increase of steam flow through conduit 24 this increased flow rate will be sensed by the orifice plate assembly 22 and the d/p cell 21 emits its signal responsive to the difference of the two pressures on opposite sides of the orifice plate through conduit 60 to the bellows 53. This increase of pressure in bellows 53 tends to expand this bellows and contract bellows 52 thus causing upward movement of the left-hand end of beam 51. This upward movement is accompanied by downward movement of the right-hand end of beam 51 thus tending to restrict air flow from nozzle 56a and thereby increasing the pressure in conduit 57 thereby tending to throttle the motor valve 23 thereby restricting flow of steam through the motor valve. Thus, in this manner irrespective of the level of liquid in flash tank 15 upon an increase of steam flow in conduit 24 the flow rate controller 20 operates to regulate the flow of steam to the steam engine 25 to its normal operating rate. Obviously, this normal operating rate is chosen by positioning setpoint 10 of level controller 19 so as to maintain a relatively constant or predetermined liquid level in tank 15.

Conversely, upon a decrease in steam flow in conduit 24, the opposite actions occur and open the motor valve 23 to allow increased steam flow to speed motor 25 so as to increase the motor speed to its normal operating speed.

In one instance the liquid material passing through conduit 11 is a liquid solution of butadiene, toluene and cis-polybutadiene rubber at a temperature of 328° F. at a pressure of 160 p.s.i.a. (pounds per square inch absolute). Flash vaporization takes place in vessel 15 at a temperature of 235° F. and at a pressure of 16 p.s.i.a. Toluene and butadiene vapors pass through conduit 16 from this flash vessel for such disposal as desired. The cis-polybutadiene rubber solution in toluene containing butadiene of reduced concentration issues from tank 15 through conduit 17 under the influence of pump 27 for such disposal as desired. Steam for actuating the engine which in turn drives pump 27 passes through conduit 24 under a pressure of 300 p.s.i.g. (pounds per square inch gauge) and this steam is exhausted from engine 25 at a pressure of about 50 p.s.i.g. At this pressure this steam has many subsequent uses as, for example, heating purposes in heat exchangers or for stripping purposes such as stripping final toluene from the cis-polybutadiene rubber.

As many serially positioned flash vaporization steps can be employed as will be required to remove the butadiene from the polymer. In one instance three flash vaporization tanks and transfer assemblies, as illustrated in FIGURE 1, are provided in series for removing butadiene from the toluene-butadiene solution of polymer to reduce the butadiene content of the polymer to a desired low level.

Such a flow recorder controller as controller 20 is fully and completely described in U.S. Patent 2,758,793. While the controller described in said patent is fully suitable for use as controller 20 in the present application, a slightly different hook-up of the instrument is required. For example, conduit 42 of the patent corresponds to conduit 57 of this application and is attached to the motor valve 23.

Conduit 57 in addition to communicating with conduit 42 of the patent also communicates with the upper right-hand bellows or pressure sensitive diaphragm 96 of FIGURE 3 of the patent. Conduit 60 of this application corresponds to conduit 39 of FIGURES 1 and 3 of the patent. Conduit 59 of this application corresponds to the upper left-hand bellows or diaphragm 98 of FIGURE 3 of the patent.

In other words, air source conduit 58 of this application corresponds to conduit 41 of FIGURES 1 and 3 of the patent. Bellows 55 and 56 correspond to diaphragms 96 and 95 of FIGURE 3 of the patent, respectively. Bellows 53 and 52 correspond to diaphragms 97 and 98, respectively, of FIGURE 3 of the patent. Pressure sensing diaphragm 98 of FIGURE 3 of the patent communicates with conduit 59 of this application while the diaphragm 97 of FIGURE 3 of the patent communicates with conduit 60 of this application. Also diaphragms 96 and 95 of the patent communicate with conduit 57 in this application.

While I have illustrated the utility of this invention as applicable to the flashing of toluene and unpolymerized butadiene from a solution of cis-polybutadiene rubber in toluene, it will be realized that the method and apparatus disclosed and claimed herein have wide utility. For example, this apparatus and method can be used for flashing normally gaseous materials from absorbent oils employed in the absorption of natural gasoline constituents in gasoline extraction plants.

While certain embodiments of the invention have been described for illustrative purposes, the invention obviously is not limited thereto.

That which is claimed is:

1. A method for regulating the operation of a pressure fluid driven motor driving a pump which pumps liquid from one zone to another zone comprising sensing the level of liquid in said one zone, manipulating the set point of a flow controller in response to the sensed liquid level, passing a signal in response to the resetting of said set point to a pressure fluid flow regulator, the flow of said fluid actuating said motor, sensing the rate of flow of said pressure fluid to said motor, and overriding the resetting operation upon sensing a rate of flow of said pressure fluid greater than the rate of flow of said pressure fluid corresponding to the setting of said set point thereby throttling the flow of said pressure fluid upon too great an increase in rate of flow of said pressure fluid and vice versa.

2. A method for regulating the operation of a pressure fluid driven motor driving a pump which pumps liquid from one zone to another zone comprising flowing pressure fluid to said motor thereby actuating same, sensing the rate of flow of said pressure fluid to said motor, sensing the level of liquid in said one zone, setting the set point of a flow controller in response to the sensed liquid level, passing a signal in response to said setting of the set point to a pressure fluid flow regulator, regulating the rate of flow of said pressure fluid responsive to said signal, passing a signal to said flow controller in response to the sensed rate of flow of said pressure fluid, this latter signal causing no change in said signal passed to said pressure liquid flow regulator when said level of liquid in said one zone is at a predetermined level, and upon sensing a level of liquid higher than said predetermined level, passing a signal in response to this higher level to said flow controller thereby resetting its set point, passing a signal in response to this resetting to said pressure fluid flow regulator thereby increasing the rate of flow of said pressure fluid to said motor driving said pump and re-establishing said predetermined liquid level in said one zone.

3. A method for controlling the rate of speed of a steam engine driving a pump which pumps liquid from one zone to another zone of higher pressure than the pressure of said one zone comprising sensing the level of liquid in said one zone and regulating the flow of steam to said engine in response to the sensed level of liquid in such a manner that as the level of liquid rises the flow of steam to said engine is increased, and vice versa, and sensing the rate of flow of steam to said engine and upon sensing a high rate of flow of steam to said engine throttling the flow thereof thereby reducing the rate of pumping of said liquid and maintaining a predetermined level of liquid in said one zone.

4. A method for controlling the speed of a reciprocating steam engine driving a reciprocating pump which pumps liquid from one zone to another zone of higher pressure than the pressure of said one zone comprising sensing the level of liquid in said one zone, and setting the set point of a flow controller in response to the sensed liquid level, passing a signal in response to said setting of the set point to a steam flow regulator, the flow of steam actuating said engine, sensing the flow of steam to said engine and upon sensing a high rate of flow of steam throttling the flow thereof thereby reducing the rate of pumping of said liquid and maintaining a predetermined level of liquid in said one zone.

5. A pumping system comprising, in operable combination, a tank, a liquid outlet line connected to a lower portion of said tank, a pump connected in said liquid outlet line to pump liquid out of said tank, a pressure fluid driven motor connected to drive said pump, a pressure fluid supply line connected to the inlet of said motor, a valve in said supply line, a flow rate controller responsive to the flow rate in said supply line controlling the opening of said valve to allow more pressure fluid flow through said supply line when said flow rate decreases and less when it increases, and a liquid level controller connected to said tank and connected to reset said flow rate controller to allow more pressure fluid flow through said supply line when the liquid level in said tank rises to a level above a predetermined level and less pressure fluid flow when the liquid level sinks to a level below another predetermined level.

References Cited in the file of this patent
UNITED STATES PATENTS

| | | |
|---|---|---|
| 1,896,237 | Veenshoten | Nov. 8, 1921 |
| 2,163,281 | Hillier | June 20, 1939 |
| 2,425,958 | Schellens | Aug. 19, 1947 |